United States Patent
Wang et al.

(10) Patent No.: US 11,823,002 B1
(45) Date of Patent: Nov. 21, 2023

(54) FAST DATA ACCESSING SYSTEM USING OPTICAL BEACONS

(71) Applicant: Snap Inc., Santa Monica, CA (US)

(72) Inventors: Jian Wang, Long Island City, NY (US); Karl Bayer, New York, NY (US); Shree K. Nayar, New York, NY (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/138,653

(22) Filed: Dec. 30, 2020

Related U.S. Application Data

(60) Provisional application No. 62/954,932, filed on Dec. 30, 2019.

(51) Int. Cl.
  *G06K 7/10*   (2006.01)
  *G06K 7/14*   (2006.01)

(52) U.S. Cl.
  CPC ....... *G06K 7/1417* (2013.01); *G06K 7/10722* (2013.01)

(58) Field of Classification Search
  CPC .......................... G06K 7/10722; G06K 7/1417
  USPC .................................................... 235/462.11
  See application file for complete search history.

(56) References Cited

U.S. PATENT DOCUMENTS

| | | | |
|---|---|---|---|
| 8,531,308 B2 * | 9/2013 | Dickie ................... | G09G 3/001 340/815.4 |
| 8,890,773 B1 * | 11/2014 | Pederson ............. | H04B 10/116 345/8 |
| 2014/0186052 A1 * | 7/2014 | Oshima ................... | H04W 4/50 398/130 |

* cited by examiner

*Primary Examiner* — Toan C Ly
(74) *Attorney, Agent, or Firm* — SCHWEGMAN LUNDBERG & WOESSNER, P.A.

(57) ABSTRACT

An apparatus to perform fast data access comprises a receiver, a processor, and a memory. The processor receives using the receiver a light signal from a light source. The light signal can be structured to generate a temporal code. The light source is an optical beacon that includes a Light-Emitting Diode (LED). The processor then decodes the light signal to generate a network address, and causes a display of a client device coupled to the apparatus to display information based on the network address. The network address can be a Uniform Resource Locator (URL) address and the information based on the network address includes a webpage associated with the URL. Other embodiments are described herein.

21 Claims, 9 Drawing Sheets

FAST DATA ACCESSING SYSTEM USING OPTICAL BEACONS

CROSS REFERENCED TO RELATED APPLICATIONS

This application claims priority to U.S. Provisional Patent Application Ser. No. 62/954,932, filed Dec. 30, 2019, the contents of which are incorporated herein by reference in their entirety.

BACKGROUND

Consumer electronic devices are typically adapted to capture image, audio as well as video content. For example, a user can use his mobile device to quickly capture a picture or video that he wishes to save for himself and review at a later time.

Spatial codes, such as Quick Response (QR) codes, are 2-dimensional codes that encodes information. For example, the information can be data for a locator, identifier or tracker that points to a website or application.

In order to obtain access to the information in a spatial code, the user may first need to unlock his mobile device, locate the camera application, point the camera at the spatial code, focus and zoom the camera such that the spatial code can be appropriately seen on the display of the mobile device, and capture the picture or video using the camera. This process is cumbersome and there is a growing demand for the mobile devices to be able to more effortlessly and quickly access encoded data.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Embodiments of the present disclosure improve the process of accessing the data encoded in a spatial code by encoding data in a light signal that can be continuously or frequently transmitted by an optical beacon and received using an apparatus with a receiver. Accordingly, examples in the present disclosure implement a fast data accessing system using optical beacons that transmit light signals and an apparatus with a receiver to receive the light signals from the optical beacons.

In one example, the apparatus that includes a receiver (e.g., receiver diode with a light emitting diode (LED). The receiver can capture and receive the light signal (e.g., a valid light code) generated by a light source such as an optical beacon. The optical beacon can transmit the light signal that encodes data to the receiver. The apparatus can decode the light signal to generate a network address and cause a display of a client device coupled to the apparatus to display information based on the network address. In one example, the apparatus is a housing or case that is external to the client device. Accordingly, in contrast to the operations required to access the data encoded in a spatial code (e.g., QR code), the apparatus with the receiver allows the user not to have to use of the client device receive information that is encoded in the light signal. This further allows for faster access to encoded data since the user is not required to unlock the client device to access the camera and manipulate the camera to properly capture the spatial code prior to gaining access to the data encoded therein.

Figure 1:
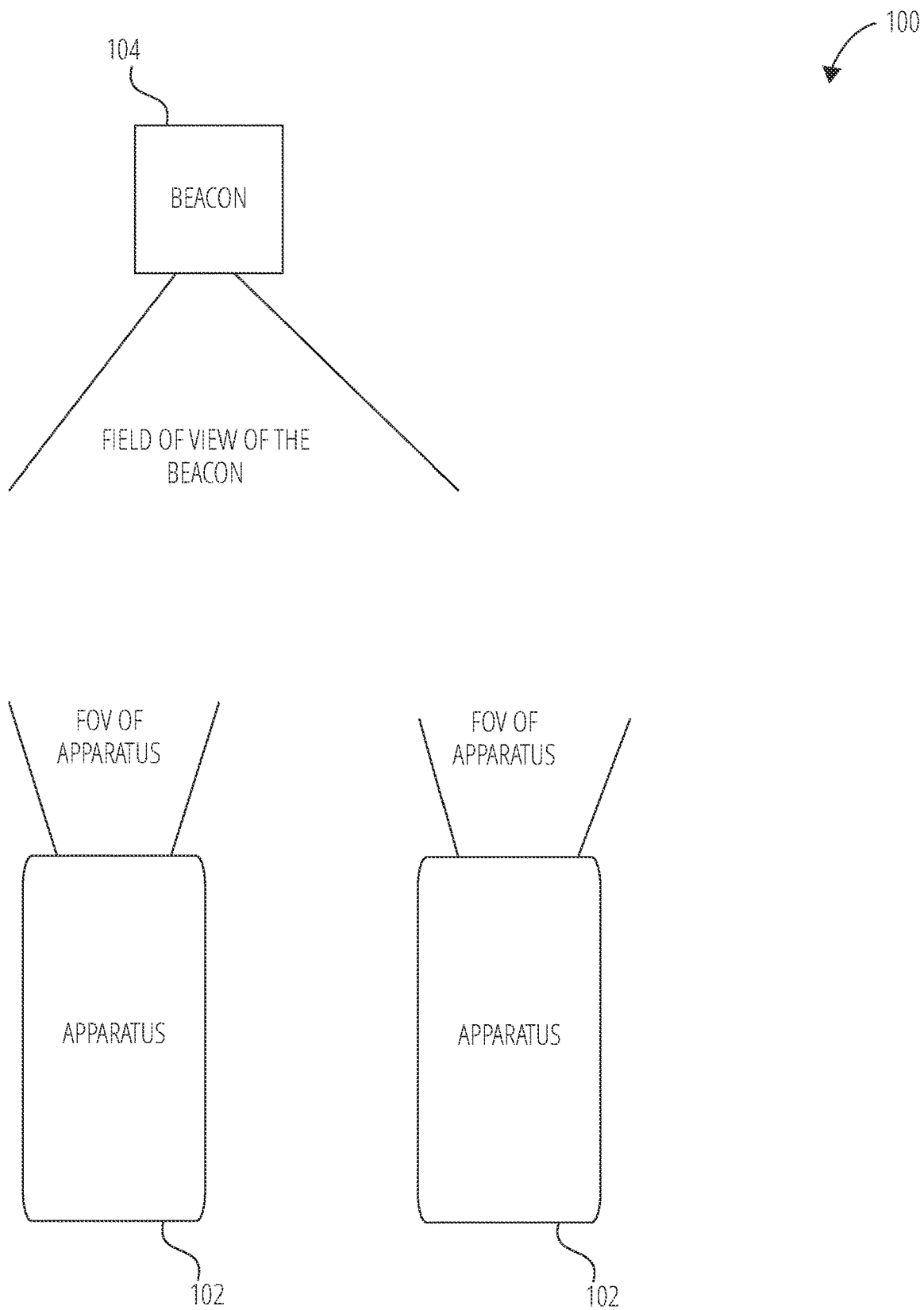
FIG. 1 illustrates a system 100 in which the present disclosure may be deployed, in accordance with some examples.

FIG. 1 illustrates a system 100 in which the present disclosure may be deployed, in accordance with some examples.

The system 100 comprises a beacon 104 and at least one apparatus 102. The beacon 104 generates a light signal that is transmitted within the beacon 104's field of view. In one example, the light signal includes encoded data and an error detecting code (e.g., cyclic redundancy check (CRC)) that is transmitted at periodic or aperiodic intervals of time by the beacon 104. The apparatus 102 can receive the light signal when the field of view of the apparatus 102 overlaps with the field of view of the beacon 104. In one example, the apparatus 102 can also perform a verification of the error detecting code in the light signal. If the light signal passes the verification, the apparatus 102 determines whether the encoded data is within a memory of the apparatus 102 (or a client device in communication with the apparatus 102) or whether the encoded data corresponds to data that can be deciphered by a server in communication with the apparatus 102. If the data is within the memory of the apparatus 102 or client device in communication with the apparatus 102 or if the encoded data corresponds to data that can be deciphered by a server, the apparatus 102 can receive the light signal and further process the encoded data.

Beacon

Figure 2:
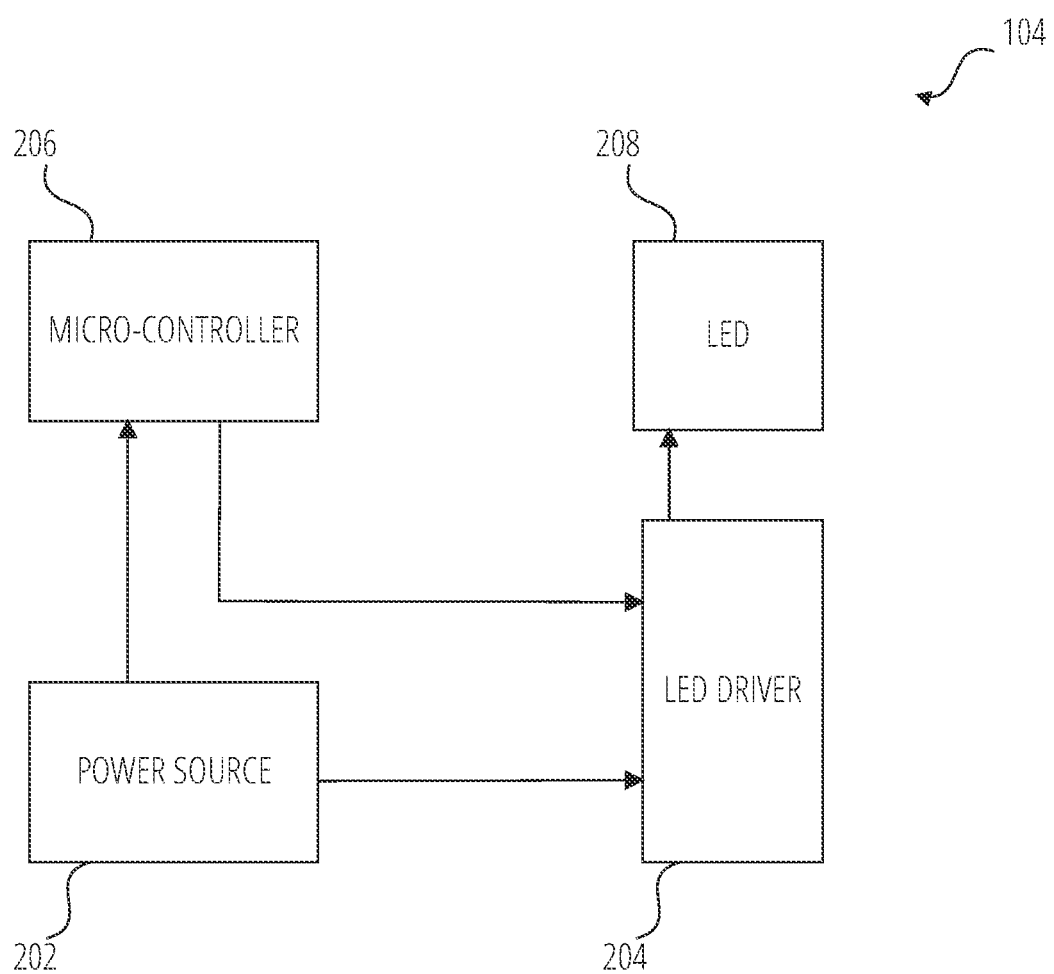
FIG. 2. is a diagrammatic representation a beacon 104 that generates a light signal in accordance with one embodiment.

FIG. 2 is a diagrammatic representation of a beacon 104 that generates a light signal received by the apparatus 102 for fast data access in accordance with one embodiment.

The beacon 104 is a device to broadcast coded light signal within a desired field of view. The beacon 104 can be an optical beacon 104 that comprises a power source 202, a controller or micro-controller 206, an LED driver 204, and an LED 208. The optical beacon 104 can be a small size device (e.g., smaller than a 25-cent coin) that is low-cost.

The power source 202 can be a power circuit that provides power to the micro-controller 206 and the LED driver 204. The power source 202 can provide different amounts of voltages to micro-controller 206 and LED driver 204 and also ground both the micro-controller 206 and LED driver 204. Similarly, the LED driver 204 can ground the LED 208. In one example, the power source 202 can provide 5 volts (V) to the micro-controller 206 and 24 volts (V) to the LED driver 204.

The micro-controller 206 can comprise a memory and processor. The memory can store instructions that cause the processor to control the LED driver 204 to activate and deactivate the LED 208 to generate the light signal, which is a temporal code. Temporal codes are in one dimension and transmitted over time. In other words, the LED 208 can be activated and deactivated in a pattern that encodes data in the light signal. Accordingly, the light signal can be structured to generate the temporal code. In one example, the light signal includes encoded data and an error detecting code (e.g., cyclic redundancy check (CRC)). The light signal can be invisible to the human eye (e.g., an infrared wavelength). The data encoded in the light signal can also be stored in the memory of the micro-controller 206.

In one embodiment, the light signal includes 168 bits of information. The light signal can encode a network address such as a Uniform Resource Locator (URL) address, a short URL, a website, an Internet Protocol (IP) address, etc. In one example, a business or corporation (e.g., restaurant, grocery store, clothing label, etc.) can program the optical beacon to be associated with their business or corporation. Accordingly, the optical beacon 104 can be programmed such that the business or corporation's URL address is encoded in the light signal that the optical beacon generates.

In one embodiment, the optical beacon 104 is configured to only transmit the light signal such that it is not configured to receive data. The optical beacon can transmit the light signal constantly or at regular intervals (e.g., at every other block of data). The optical beach can also be transmitting at intervals to save power. In order for the light signal to not be distracting to the human eye, the light signal can be of a wavelength that is invisible to the human eye. The light signal can be wavelengths that approximate the light spectrum (e.g., infrared signals or infrared lights). In one embodiment, the optical beacon can transmit the light signal over a long distance (e.g., 15 feet) and has a wide field of view (e.g., 100 degrees).

Apparatus with Receiver

Figure 3:
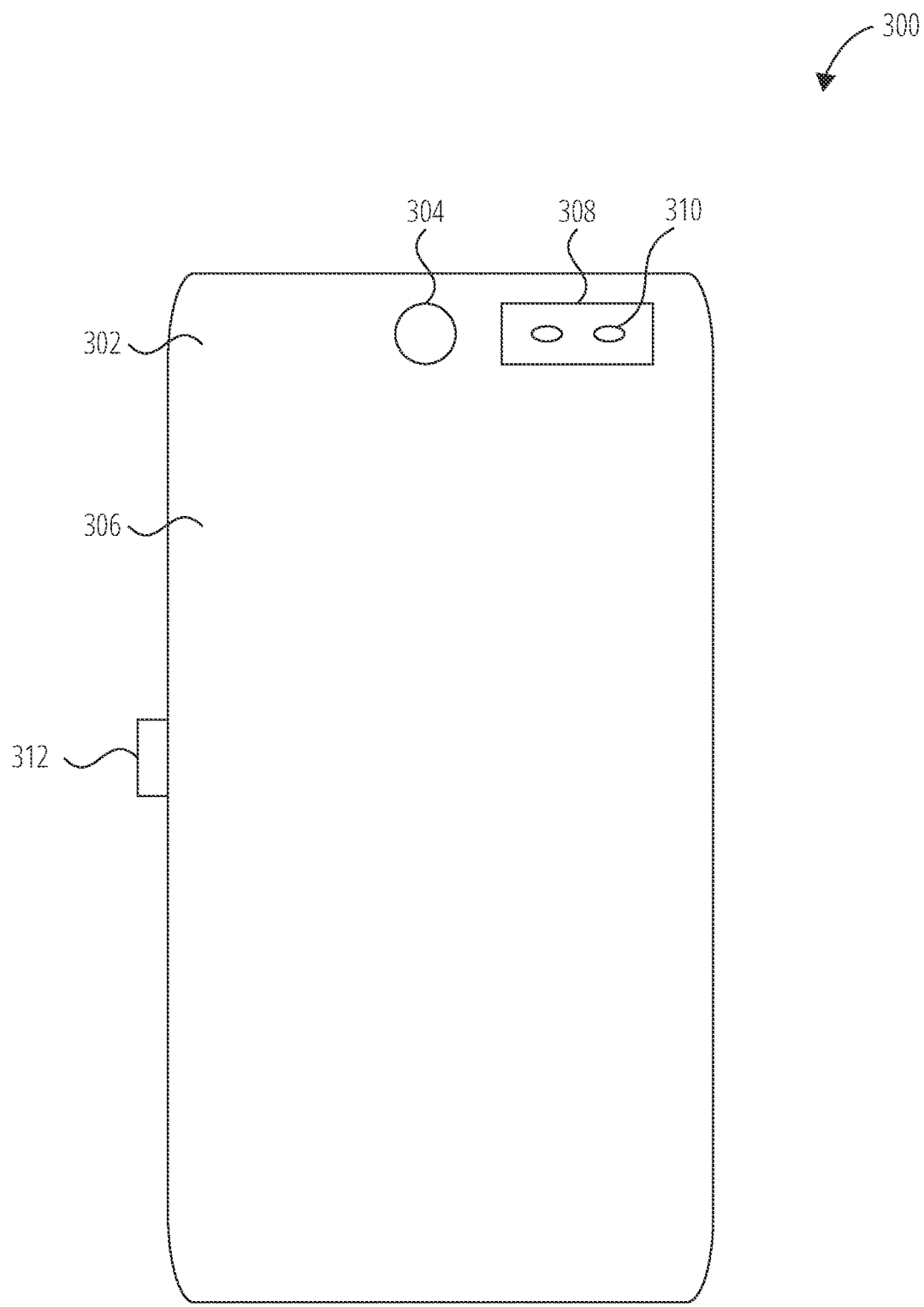
FIG. 3 illustrates a system 300 in which the apparatus 302 with a receiver 308 can be implemented according to one example embodiment.

FIG. 3 illustrates a system 300 in which the apparatus 302 with a receiver 308 can be implemented according to one example embodiment. The system 300 in FIG. 3 comprises an apparatus 302 and a client device (not shown). The apparatus 302 is one example of the apparatus 102 in FIG. 1.

The apparatus 302 comprises a housing case or a device extension that can be coupled to a client device (not shown). A housing case can be a protective case for the client device. The device extension can be an external device that can be coupled to the client device, for example, magnetically.

Figure 7:
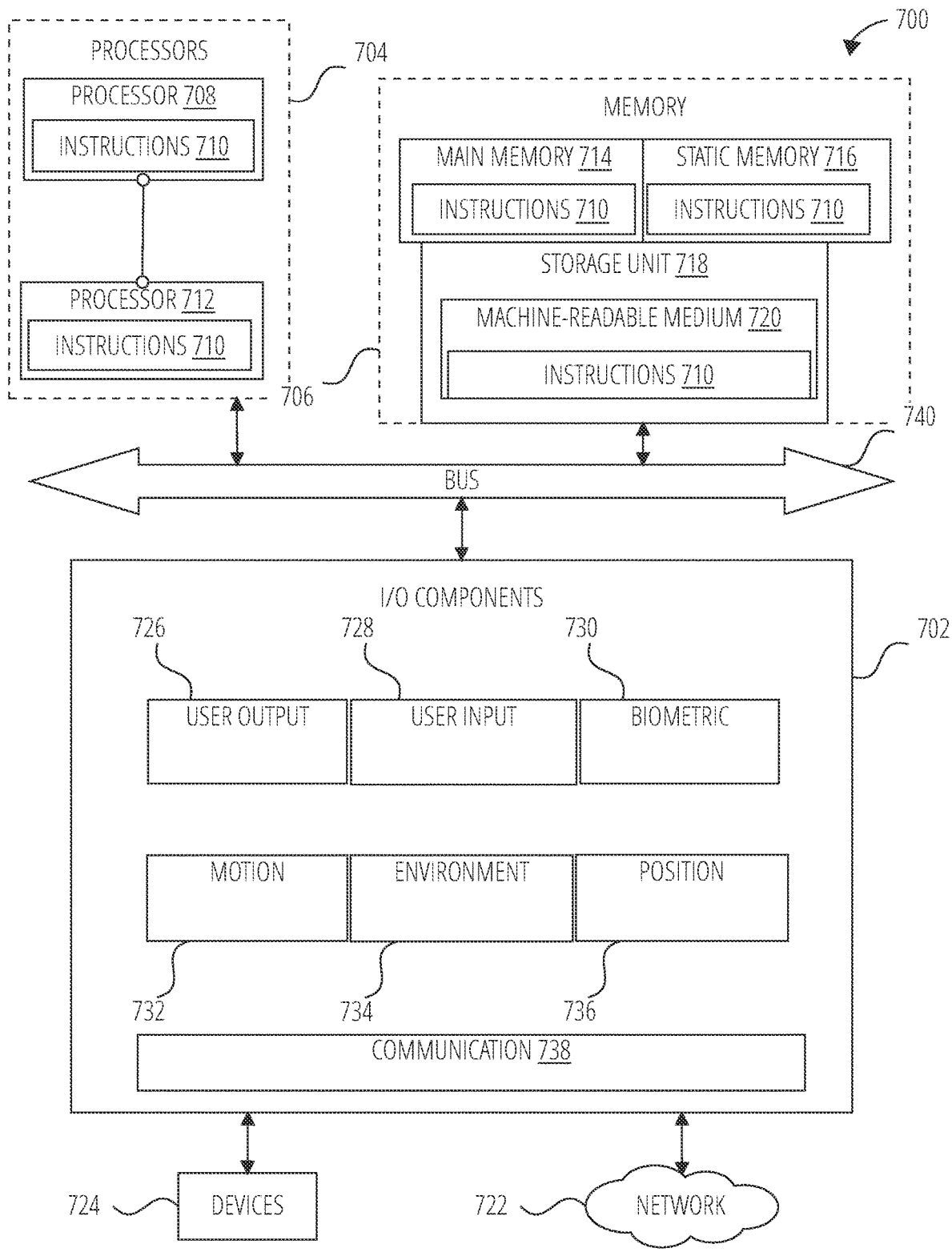
FIG. 7 is a diagrammatic representation of a machine in the form of a computer system within which a set of instructions may be executed for causing the machine to perform any one or more of the methodologies discussed herein, in accordance with some examples.

In other embodiments, rather than being an external case or housing, the apparatus 302 is incorporated in any client device having a receiver 308. For example, the client device can be the machine 700 as illustrated in FIG. 7.

As shown in FIG. 3, the apparatus 302 comprises a housing 306, a camera opening 304, a button 312 and a receiver 308. While not shown in FIG. 3, the apparatus 302 can also comprise a processor, a memory, a communication interface and a power source (e.g., a battery). In one embodiment, the housing 306 is shaped to be coupled to a client device. In another embodiment, the housing 306 is the housing of the client device having the receiver 308.

In one embodiment, the camera opening 304 is an opening in the housing 306 that couples to a camera lens of a camera included in the apparatus 504. In one embodiment, the camera opening can be a window allowing the camera lens to capture image or video content (e.g., media content items).

The receiver 308 comprises a receiver diode. In one example, the receiver 308 can also comprise the LED 310. The receiver 308 can be coupled to an opening (not shown) in the housing 306. Via the opening, the receiver 308 can capture and receive the light signal generated by a light source such as the optical beacon 104. The light signal that received by the receiver 308 can be structured to generate a temporal code. The light signal can be invisible to the human eye (e.g., an infrared wavelength). In one embodiment, the opening in the housing 306 is at the top edge of the housing 306.

In one embodiment, a receiver 308 can be replaced by a transceiver that is an infrared (IR) lightcode transceiver. The opening in the housing can allow the transceiver to transmit or receive a light signal. In this example, the apparatus 302 that includes the transceiver can also act as a transmitter of light signals for capture by other apparatuses with receivers 308 (or transceivers).

The processor in the apparatus 302 can receive using the receiver 308 the light signal from the optical beacon 104 and decode the light signal to generate the network address. The processor in the apparatus 302 can further cause the display of the client device coupled to the apparatus 302 to display information based on the network address. For example, if the network address is a restaurant's URL, the information based on the network address can be the webpage associated with the URL. The client device in this example is caused to display the webpage associated with the restaurant's URL. In another example, a user in the restaurant can receive the light signal using the apparatus 302 that encodes a restaurant review website (e.g., Yelp), the information that is displayed on the client device can include the reviews pertaining to the restaurant.

In another embodiment., the network address can provide a link to information that is provided by the business. For example, the user who is in a retail business' showroom can capture a light signal that encodes the link to further information on a product or on the retail business. In this example, the information that is caused to be displayed can be further details on a product for sale by the retail business or further information on the retail business. The information that is caused to be displayed can also include a price, product name, product specifications, service provider name, service provider details, physical addresses, telephone number, etc.

In another example, a media corporation or network (e.g., HBO) can be associated with the optical beacon such that the network address encoded in the light signal can provide a link to a new episode of a television show. In this example, the processor can receive the light signal using the receiver 308, decode the light signal to generate the network address of the link to the new episode and cause the client device to start playing the new episode or displaying information on the new episode.

In one embodiment, an event organizer (e.g., music festival, conference, etc.) can use the optical beacons to provide information on the event or event organizer, notifications, news, changes to schedules, announcements etc. In this embodiment, the optical beacons can generate light signals that allow users to register for the event. The users' client devices can be caused to display the registration page URL to the event. Once registered, the optical beacons can be used to create a network for users at the event that is limited within the time frame of the event and/or within the event geofence. Within the optical beacon created network, the users can communicate with each other and share media content items and collaborate on shared media content items. In this embodiment, the apparatus 302 can cause the client device to display the electronic communication interface associated with the event's network address (e.g., URL).

In one embodiment, the receiver 308 of the apparatus 302 can be configured to continuously scan for light signals from, for example, optical beacons 104 or transceivers from other apparatuses. As shown in FIG. 3, the apparatus 302 can also include a button 312 coupled to the receiver 308. The button 312 can be a virtual button or a physical button. In one embodiment, the receiver 308 is a transceiver, as discussed above. When the button 312 is activated by the user, the transceiver is caused to operate in transmission mode. In transmission mode, the transceiver can act as a beacon. The processor of the apparatus 302 can detect the activation of the button 312 and cause the transceiver to operate in transmission mode.

In one example, the activation of the button 312 is a single press or click of the button 312 which causes the transceiver to operate in transmission mode until a subsequent activation of the button 312 by single press or click is detected.

In another example, the activation of the button 312 can be an engagement of the button 312 for a period of time. For example, the user presses and holds the button 312 to cause the transceiver to operate in transmission mode. In response to detecting the engagement of the button 312 for the period of time, the transceiver is caused to operate in transmission mode which lasts the duration of the period of time that the user is pressing and holding the button 312.

In transmission mode, the transceiver transmits a light signal. The light signal being transmitted can encode data that is associated with the client device coupled to the apparatus 302. For example, the light signal being transmitted can encode contact information associated with the user of the client device or associated with the client device. In this embodiment, the transceiver can remain operating in receiving mode until the activation of the button 312 is detected. In receiving mode, the transceiver can be configured to continuously scan for light signals from, for example, optical beacons or transceivers from other apparatuses.

Given that the optical beacon 104 can constantly send or send at regular intervals the data (e.g., light signal) and the transceiver can be set to be in receiving mode by default (e.g., when the button 312 is not activated), the transceiver can receive instantly the information from the entity associated with the optical beacon (e.g., business, product, etc.). An additional advantage of the apparatus 302 is that the transceiver consumes less power from the power source to operate in receiving mode than in transmission mode.

As shown in FIG. 3, the receiver 308 can be coupled to or include a plurality of LEDs 310. In one embodiment, the receiver 308 is coupled to a first LED 310 and the processor of the apparatus 302 can cause the first LED 310 to be activated when the receiver 308 is receiving the light signal. In the example where the receiver 308 is a transceiver, the transceiver can also be coupled to a second LED 310 and the processor of the apparatus 302 can cause the second LED 310 to be activated when the transceiver is transmitting a light signal (e.g., transmission signal). Accordingly, the LEDs 310 provide visual feedback to the user regarding the operation mode of the receiver 308 (or transceiver).

In one example, when the receiver 308 is a transceiver, the transceiver is composed of a transmission diode (LED) and a receiving diode. Additionally, the apparatus 302 can also include, in the plurality of LEDs, a smaller LED to act as indicator LED.

Figure 4:
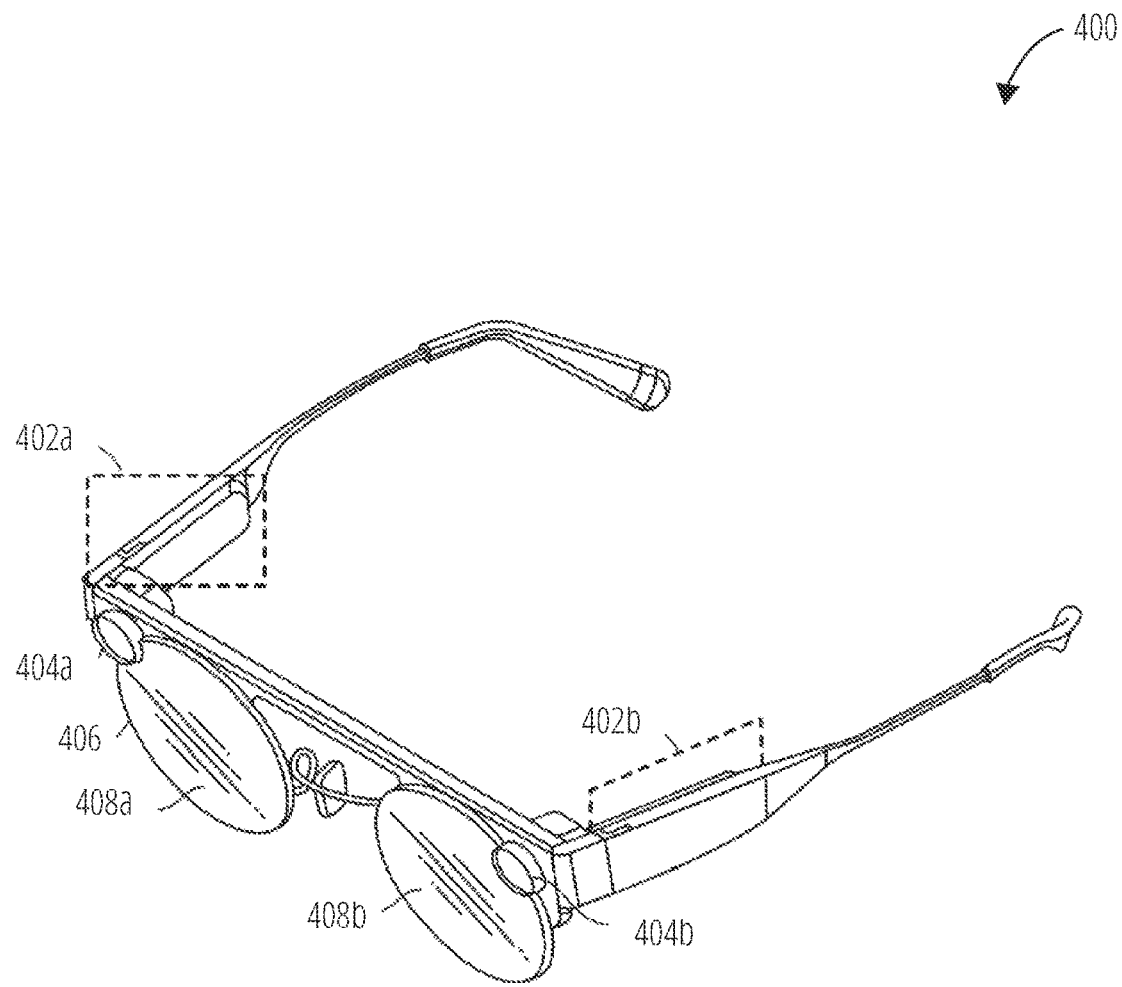
FIG. 4 illustrates a head-wearable apparatus 400 in which the receiver 308 can be implemented according to one example embodiment.

FIG. 4 illustrates a head-wearable apparatus 400 in which the receiver 308 can be implemented according to one example embodiment. The head-wearable apparatus 400 is one example of the apparatus 102 in FIG. 1.

FIG. 4 illustrates a perspective view of the head-wearable apparatus 400 according to one example embodiment. In FIG. 4, the head-wearable apparatus 400 is a pair of eyeglasses. In some embodiments, the head-wearable apparatus 400 can be sunglasses or goggles. Some embodiments can include one or more wearable devices, such as a pendant with an integrated camera that is integrated with, in communication with, or coupled to, the head-wearable apparatus 400 or a client device. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 400 can be included in a client device (e.g., machine 700 in FIG. 7) that can be used in conjunction with the head-wearable apparatus 400.

In FIG. 4, the head-wearable apparatus 400 is a pair of eyeglasses that includes a frame 406 that includes eye wires (or rims) that are coupled to two stems (or temples), respectively, via hinges and/or end pieces. The eye wires of the frame 406 carry or hold a pair of lenses (e.g., lens 408a and lens 408b). The frame 406 includes a first (e.g., right) side that is coupled to the first stem and a second (e.g., left) side that is coupled to the second stem. The first side is opposite the second side of the frame 406.

The head-wearable apparatus 400 further includes a camera module (not shown) that includes camera lenses (e.g., camera lens 404a, camera lens 404b) and at least one image sensor. The camera lens 404a and camera lens 404b may be a perspective camera lens or a non-perspective camera lens. A non-perspective camera lens may be, for example, a fisheye lens, a wide-angle lens, an omnidirectional lens, etc. The image sensor captures digital video through the camera lens 404a and camera lens 404b. The images may be also be still image frame or a video including a plurality of still image frames. The camera module can be coupled to the frame 406. As shown in FIG. 4, the frame 406 is coupled to the camera lens 404a and camera lens 404b such that the camera lenses (e.g., camera lens 404a, camera lens 404b) face forward. The camera lens 404a and camera lens 404b can be perpendicular to the lens 408a and lens 408b. The camera module can include dual-front facing cameras that are separated by the width of the frame 406 or the width of the head of the user of the head-wearable apparatus 400.

In FIG. 4, the two stems (or temples) are respectively coupled to microphone housing 402a and microphone housing 402b. The first and second stems are coupled to opposite sides of a frame 406 of the head-wearable apparatus 400. The first stem is coupled to the first microphone housing 402a and the second stem is coupled to the second microphone housing 402b. The microphone housing 402a and microphone housing 402b can be coupled to the stems between the locations of the frame 406 and the temple tips. The microphone housing 402a and microphone housing 402b can be located on either side of the user's temples when the user is wearing the head-wearable apparatus 400.

As shown in FIG. 4, the microphone housing 402a and microphone housing 402b encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectromechanical systems (MEMS) microphones. The acoustic signals generated by the microphones can be pulse density modulation (PDM) signals.

In one embodiment, the receiver 308 can be coupled to the frame 406 or to the first temple (stem). In one example, the receiver 308 is coupled to the portion of the frame 406 adjacent to the camera lens 404a or camera lens 404b to capture and receive light signals from beacons 104 that are within the user wearing the head-wearable apparatus 400's field of view. The receiver 308 can receive light signals as the user wearing the head-wearable apparatus 400 pans (or looks around). Accordingly, the receiver 308 can constantly be ready to receive light signals and process the light signal to provide information encoded therein to the user. In one embodiment, the pair of lenses (e.g., lens 408a and lens 408b) can include a display device. In this embodiment, when the processor in the head-wearable apparatus 400 receives using the receiver 308 a light signal from a light source (e.g., an optical beacon 104), the processor can decode the light signal to generate a network address and cause the display device in the lenses (e.g., lens 408a and lens 408b) to display information based on the network address for the user to view.

In one example, the button 312 that is a physical or virtual button can also be coupled to the frame 406. The user of the head-wearable apparatus 400 can press or click the button 312 to cause the receiver 308 (that is a transceiver) to operate in transmission mode and to transmit light signals.

Figure 5:
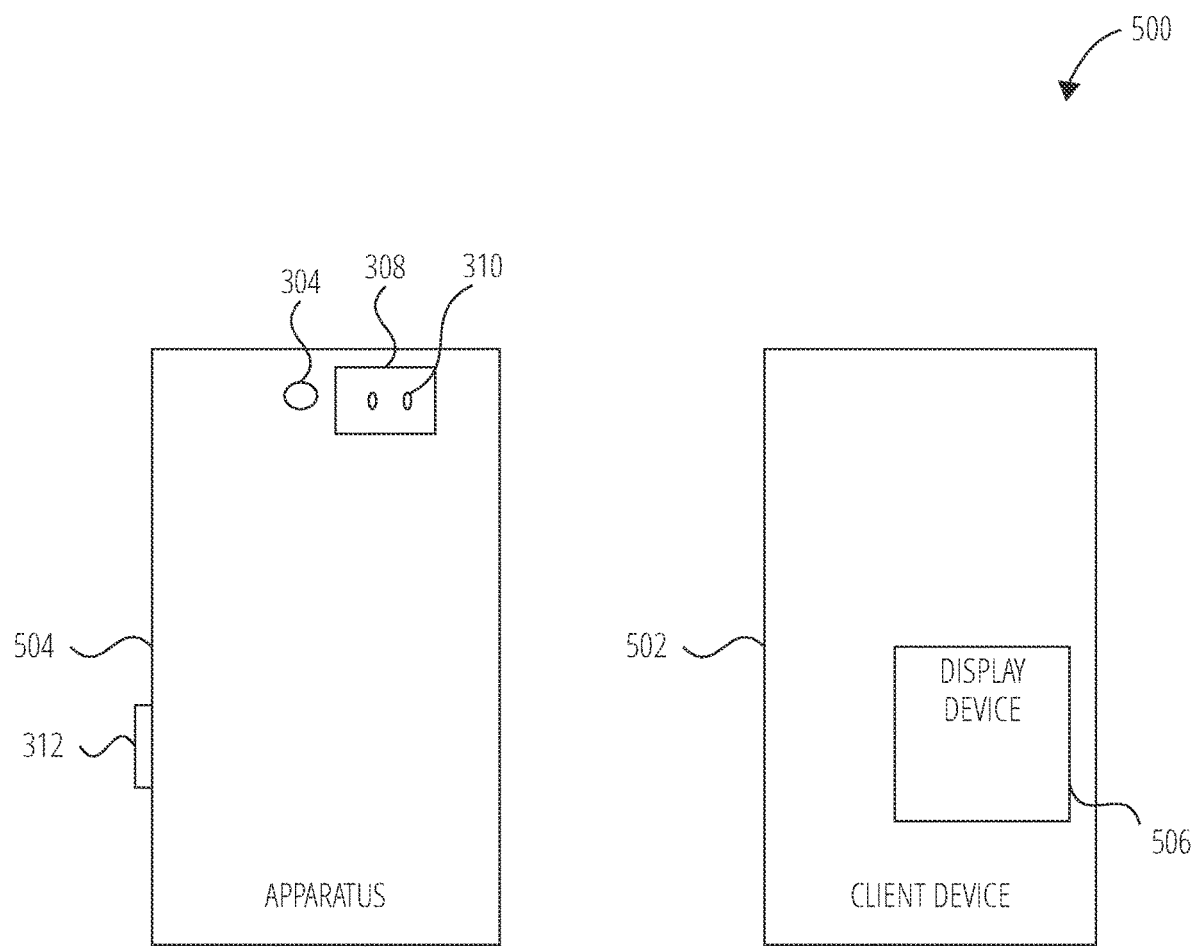
FIG. 5 illustrates a system 500 in which the apparatus 504 with the receiver 308 can be implemented according to one example embodiment.

FIG. 5 illustrates a system 500 in which the apparatus 504 with the receiver 308 can be implemented according to one example embodiment. The apparatus 504 is one example of the apparatus 102 in FIG. 1. In this embodiment, the system 500 includes an apparatus 504 including the receiver 308 that is communicatively coupled to the client device 502 that comprises a display device 506. The apparatus 504 (or the receiver 308) can be communicatively coupled to the client device 502 via a wired connection (e.g., USB cables) or a wireless connection (e.g., WiFi, BlueTooth, 5G).

In another example, instead of the apparatus 504 in system 500, the head-wearable apparatus 400 or other wearable device, can be included in the system 500 and include the receiver 308 hat is communicatively coupled to the client device 502. Some embodiments may include one or more wearable devices, such as a pendant with an integrated camera that is integrated with, in communication with, or coupled to, the client device 502. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

In FIG. 5, the apparatus 504 comprises a processor and a receiver 308. The apparatus 504 (or the receiver 308) is communicatively coupled to the client device 502. The client device 502 comprises a display device 506 which is also communicatively coupled to the apparatus 504 (or receiver 308). In this embodiment, the apparatus 504 causes a display of a client device coupled to the apparatus to display information based on the network address. In one example, the apparatus 504 also receives using the receiver 308 a light signal from the light source (e.g., optical beacon 104) and decodes the light signal to generate the network address.

In the embodiments described herein, the apparatus 504 provides a more efficient system by decreasing the time and the steps required to capture a code (e.g., spacial code) and decode the code to obtain the data therein. For example, in one embodiment, the receiver 308 is constantly or primary active in receiving mode to capture the light signals from beacons 104 that are also constantly or frequently transmitting.

The apparatus 504 allows the user to capture the light signal simply by having the apparatus 504's field of view within the field of view of the beacon 104. The apparatus 504 allows the user to not have to use the client device 502 to capture a signal with the encoded data. This further allows for faster access to data since the user is not required to unlock the client device 502 to capture the signal.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Performing Fast Data Access Using the Apparatus with Receiver

Figure 6:
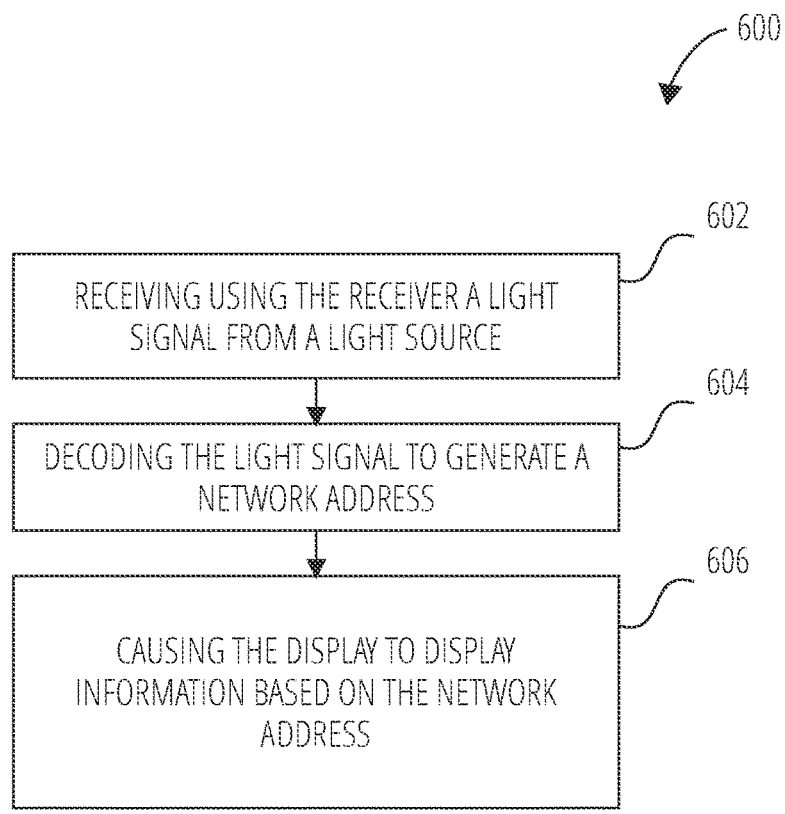
FIG. 6 is a flowchart for a process 600 of performing fast data access using an apparatus with a receiver 308, in accordance with some examples.

FIG. 6 is a flowchart illustrating a process 600 for performing fast data access using an apparatus with a receiver 308, in accordance with some examples.

At operation 602, the processor of the apparatus 102 receives using the receiver 308 a light signal from a light source. The receiver can comprise a receiver diode. In another embodiments, the receiver 308 can also comprise an LED 310.

In one example, the light signal is structured to generate a temporal code. The light signal can be an infrared wavelength. The light source can be an optical beacon 104 that comprises an LED 208, an LED driver 204, a microcontroller 206 and a power source 202. The optical beacon 104 transmits the light signal constantly or at a regular interval.

At operation 604, the processor of the apparatus 102 decodes the light signal to generate a network address.

At operation 606, the processor of the apparatus 102 causes a display of a client device coupled to the apparatus to display information based on the network address. The apparatus 102 can be coupled to the client device. In one example, the network address is a Uniform Resource Locator (URL) address and the information based on the network address includes a webpage associated with the URL. In another example, the information based on the network address includes a price, product name, product specifications, service provider name, service provider details, physical addresses, or telephone number.

In one embodiment, the receiver 308 is a transceiver that comprises an infrared (IR) lightcode transceiver. The apparatus 102 can further include a button 312 coupled to the transceiver. The button 312 is a virtual button or physical button. The processor of the apparatus 102 can detect the activation of the button 312 and upon detection of the activation of the button 312, the processor causes the transceiver to operate in transmission mode. In one example, the transceiver operates in receiving mode until the processor detects the activation of the button.

In one embodiment, the transceiver is coupled to a first LED 310 and a second LED 310. The processor of the apparatus 102 can cause the first LED 310 to be activated when the transceiver is receiving the light signal and can cause the second LED 310 to be activated when the transceiver is transmitting a transmission signal. In one embodiment, the transmission signal is a light signal that is structured to generate a temporal code.

Machine Architecture

FIG. 7 is a diagrammatic representation of the machine 700 within which instructions 710 (e.g., software, a program, an application, an apples, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 502 or any one of a number of server devices forming part of the messaging server system 108 (deleted). In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728, The user output components 726 may include visual components (e.g., a display such as a plasma display panel (PDP), a light-emitting; diode (LED) display, a liquid crystal display (LCD), a projector, or a cathode ray tube (CRT)), acoustic components e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components); point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 502 may have a camera system comprising, for example, front cameras on a front surface of the client device 502 and rear cameras on a rear surface of the client device 502. The front cameras may, for example, be used to capture still images and video of a user of the client device 502 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 502 may also include a 360° camera for capturing 360° photographs and videos.

Further, the camera system of a client device 502 may include dual rear cameras (e.g., a primary camera as well as a depth-sensing camera), or even triple, quad or penta rear camera configurations on the front and rear sides of the client device 502. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
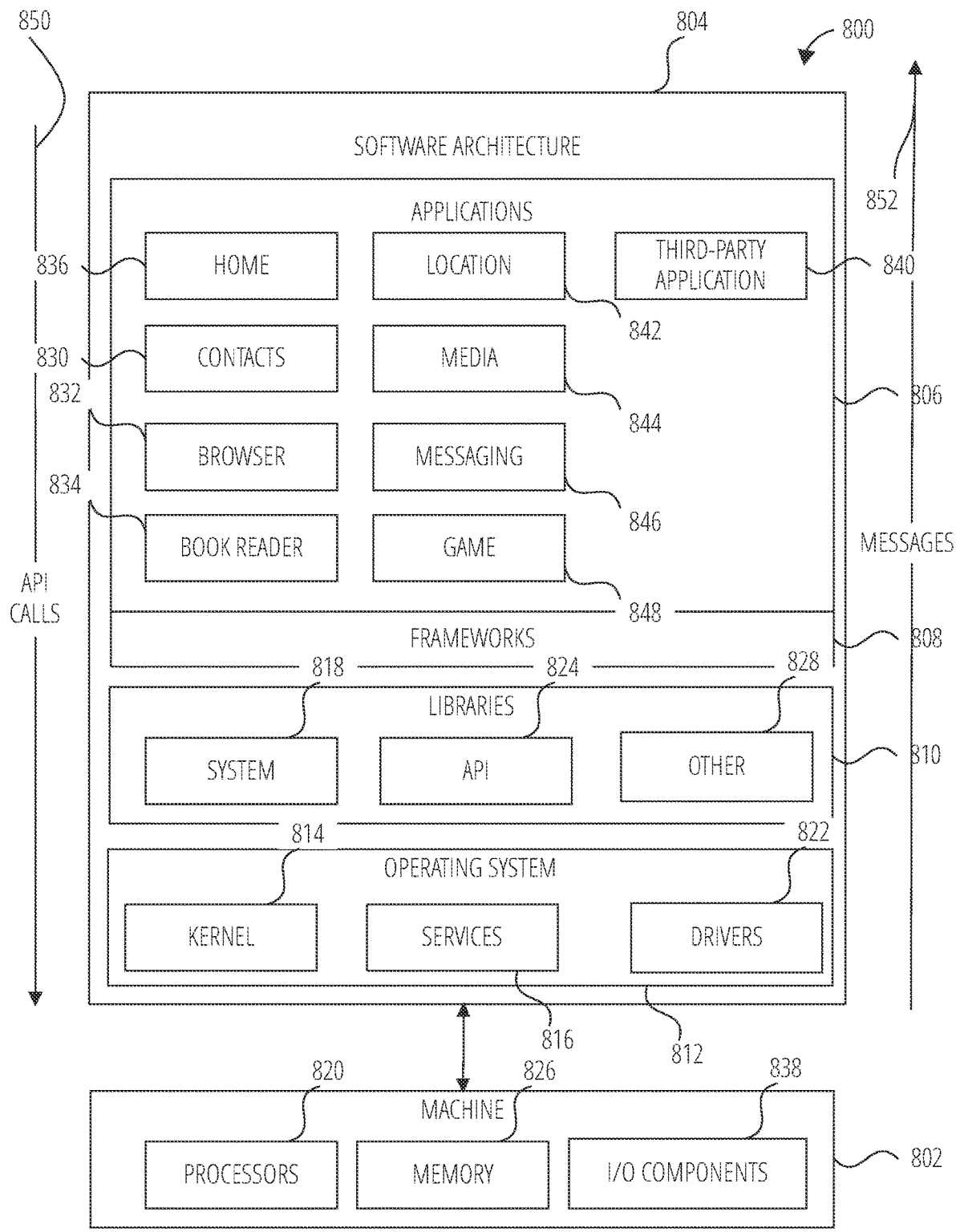
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services, The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

System with Head-Wearable Apparatus

Figure 9:
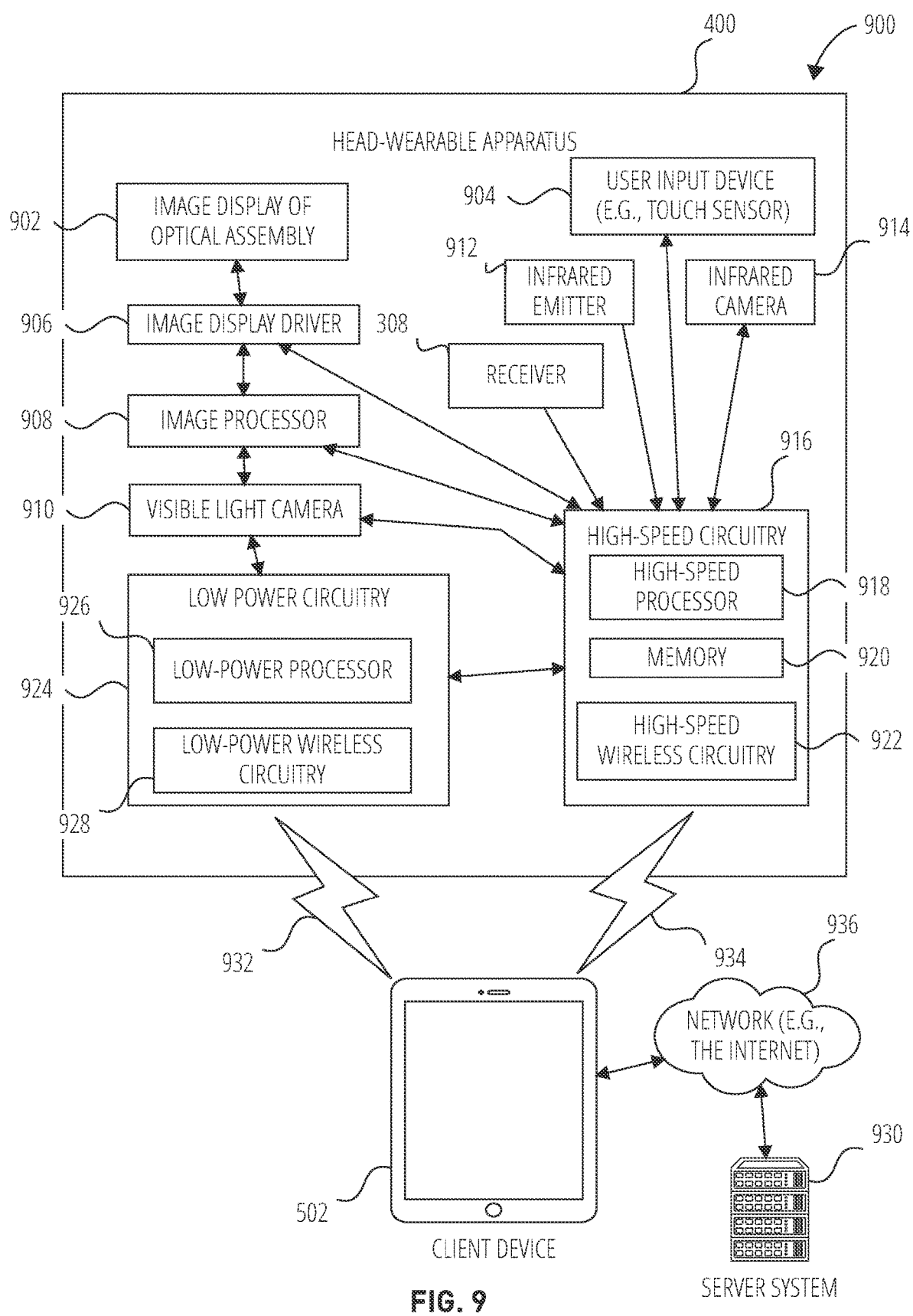
FIG. 9 illustrates a system 900 in which the head-wearable apparatus 400 with receiver 308 can be implemented according to one example embodiment.

FIG. 9 illustrates a system 900 in which the head-wearable apparatus 400 with a receiver 308 can be implemented according to one example embodiment. FIG. 9 is a high-level functional block diagram of an example head-wearable apparatus 400 communicatively coupled a mobile client device 502 and a server system 930 via various network 936.

Head-wearable apparatus 400 includes a camera, such as at least one of visible light camera 910, infrared emitter 912 and infrared camera 914. The camera can include the camera module with the camera lens 404a and camera lens 404b in FIG. 4.

Client device 502 can be capable of connecting with head-wearable apparatus 400 using both a low-power wireless connection 932 and a high-speed wireless connection 934. Client device 502 is connected to server system 930 and network 936. The network 936 may include any combination of wired and wireless connections.

Head-wearable apparatus 400 further includes two image displays of the image display of optical assembly 902. The two image displays of optical assembly 902 include one associated with the left lateral side and one associated with the right lateral side of the head-wearable apparatus 400. Head-wearable apparatus 400 also includes image display driver 906, image processor 908, low-power low power circuitry 924, and high-speed circuitry 916. Image display of optical assembly 902 are for presenting images and videos, including an image that can include a graphical user interface to a user of the head-wearable apparatus 400.

Image display driver 906 commands and controls the image display of the image display of optical assembly 902. Image display driver 906 may deliver image data directly to the image display of the image display of optical assembly 902 for presentation or may have to convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 400 includes a frame 406 and stems (or temples) extending from a lateral side of the frame 406. Head-wearable apparatus 400 further includes a user input device 904 (e.g., touch sensor or push button) including an input surface on the head-wearable apparatus 400. The user input device 904 (e.g., touch sensor or push button) is to receive from the user an input selection to manipulate the graphical user interface of the presented image.

The components shown in FIG. 9 for the head-wearable apparatus 400 are located on one or more circuit boards, for example a PCB or flexible PCB, in the rims or temples. Alternatively, or additionally, the depicted components can be located in the chunks, frames, hinges, or bridge of the head-wearable apparatus 400. Left and right visible light cameras 910 can include digital camera elements such as a complementary metal-oxide-semiconductor (CMOS) image sensor, charge coupled device, a camera lens 404a and camera lens 404b, or any other respective visible or light capturing elements that may be used to capture data, including images of scenes with unknown objects.

Head-wearable apparatus 400 includes a memory 920 which stores instructions to perform a subset or of the functions described herein. Memory 920 can also include storage device.

As shown in FIG. 9, high-speed circuitry 916 includes high-speed processor 918, memory 920, and high-speed wireless circuitry 922. In the example, the image display driver 906 is coupled to the high-speed circuitry 916 and operated by the high-speed processor 918 in order to drive the left and right image displays of the image display of optical assembly 902. High-speed processor 918 may be any processor capable of managing high-speed communications and operation of any general computing system needed for head-wearable apparatus 400. High-speed processor 918 includes processing resources needed for managing high-speed data transfers on high-speed wireless connection 934 to a wireless local area network (WLAN) using high-speed wireless circuitry 922. In certain examples, the high-speed processor 918 executes an operating system such as a LINUX operating system or other such operating system of the head-wearable apparatus 400 and the operating system is stored in memory 920 for execution. In addition to any other responsibilities, the high-speed processor 918 executing a software architecture for the head-wearable apparatus 400 is used to manage data transfers with high-speed wireless circuitry 922. In certain examples, high-speed wireless circuitry 922 is configured to implement Institute of Electrical and Electronic Engineers (IEEE) 802.11 communication standards, also referred to herein as In other examples, other high-speed communications standards may be implemented by high-speed wireless circuitry 922.

Low-power wireless circuitry 928 and the high-speed wireless circuitry 922 of the head-wearable apparatus 400 can include short range transceivers (Bluetooth™) and wireless wide, local, or wide area network transceivers (e.g., cellular or WiFi). Client device 502, including the transceivers communicating via the low-power wireless connection 932 and high-speed wireless connection 934, may be implemented using details of the architecture of the head-wearable apparatus 400, as can other elements of network 936.

Memory 920 includes any storage device capable of storing various data and applications, including, among other things, camera data generated by the left and right visible light cameras 910, infrared camera 914, and the image processor 908, as well as images generated for display by the image display driver 906 on the image displays of the image display of optical assembly 902. While memory 920 is shown as integrated with high-speed circuitry 916, in other examples, memory 920 may be an independent standalone element of the head-wearable apparatus 400. In certain such examples, electrical routing lines may provide a connection through a chip that includes the high-speed processor 918 from the image processor 908 or low-power processor 926 to the memory 920. In other examples, the high-speed processor 918 may manage addressing of memory 920 such that the low-power processor 926 will boot the high-speed processor 918 any time that a read or write operation involving memory 920 is needed.

As shown in FIG. 9, the low-power processor 926 or high-speed processor 918 of the head-wearable apparatus 400 can be coupled to the camera (visible light camera 910; infrared emitter 912, or infrared camera 914), the image display driver 906, the user input device 904 (e.g., touch sensor or push button), and the memory 920.

Head-wearable apparatus 400 is connected with a host computer. For example, the head-wearable apparatus 400 is paired with the client device 502 via the high-speed wireless connection 934 or connected to the server system 930 via the network 936. Server system 930 may be one or more computing devices as part of a service or network computing system, for example, that include a processor, a memory, and network communication interface to communicate over the network 936 with the client device 502 and head-wearable apparatus 400.

The client device 502 includes a processor and a network communication interface coupled to the processor. The network communication interface allows for communication over the network 936, low-power wireless connection 932 or high-speed wireless connection 934. Client device 502 can further store at least portions of the instructions in the client device 502's memory to implement the functionality described herein.

Output components of the head-wearable apparatus 400 include visual components, such as a display such as a liquid crystal display (LCD), a plasma display panel (PDP), a light emitting diode (LED) display, a projector, or a waveguide. The image displays of the optical assembly are driven by the image display driver 906. The output components of the head-wearable apparatus 400 further include acoustic components (e.g., speakers), haptic components (e.g., a vibratory motor), other signal generators, and so forth. The input components of the head-wearable apparatus 400, the client device 502, and server system 930, such as the user input device 904, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components a physical button, a touch screen that provides location and force of touches or touch gestures, or other tactile input components), audio input components (e.g., a microphone), and the like.

Head-wearable apparatus 400 may optionally include additional peripheral device elements. Such peripheral device elements may include biometric sensors, additional sensors, or display elements integrated with head-wearable apparatus 400. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 932 and high-speed wireless connection 934 from the client device 502 via the low-power wireless circuitry 928 or high-speed wireless circuitry 922.

The head-wearable apparatus 400 further comprises receiver 308 to receive the light signal from one or more optical beacons 104. The receiver 308 is coupled to the high-speed processor 918 that can perform a verification on the error detecting code (e.g., CRC check) of the light signal. The high-speed processor 918 can further process the light signal to determine whether the data encoded thereon is valid (e.g., has meaning) by searching the memory 920 or by querying the server system 930.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine, "Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An apparatus comprising:
   a receiver;
   a processor; and
   a memory having instructions stored thereon, when executed by the processor, causes the processor to perform operations comprising:
   receiving using the receiver a light signal from a light source associated with an advertisement for an establishment or a corporation,
   decoding the light signal to generate a network address associated with the establishment or the corporation, and
   causing a display of a client device to display a website corresponding to the network address, wherein the apparatus is a housing case that is separate from the client device, wherein the housing case is a protective case that is removably attached to the client device.

2. The apparatus of claim 1, wherein e receiver comprises a receiving diode.

3. The apparatus of claim 1, wherein the light signal is structured to generate a temporal code, wherein the light source includes a Light-Emitting Diode (LED) that is activated and deactivated in a pattern that encodes data in the light signal as the temporal code.

4. The apparatus of claim 1, wherein the light signal is an infrared wavelength.

5. The apparatus of claim 1, wherein the light source is an optical beacon that includes a Light-Emitting Diode (LED), an LED driver, a micro-controller and a power source.

6. The apparatus of claim 5, wherein the optical beacon transmits the light signal constantly or at a regular interval.

7. The apparatus of claim 1, wherein the receiver is a transceiver that comprises an infrared (IR) lightcode transceiver.

8. The apparatus of claim 7, further comprising:
   a button coupled to the transceiver, wherein activation of the button causes the transceiver to operate in transmission mode, wherein the button is a virtual button or physical button.

9. The apparatus of claim 8, wherein the transceiver operates in receiving mode until the processor detects the activation of the button.

10. The apparatus of claim 9, wherein the transceiver is coupled to a first LED, wherein the processor causes the first LED to be activated when the transceiver is receiving the light signal.

11. The apparatus of claim 10, wherein the -transceiver is coupled to a second LED, wherein processor causes the second LED to be activated when the transceiver is transmitting a transmission signal.

12. The apparatus of claim 11, wherein the transmission signal is a light signal that is structured to generate a temporal code.

13. The apparatus of claim 1, wherein the network address is a Uniform Resource Locator (URL) address and the website is associated with the URL.

14. The apparatus of claim 1, wherein the website includes a price, product name, product specifications, service provider name, service provider details, physical addresses, or telephone number.

15. The apparatus of claim 1, wherein the light signal comprises encoded data and an error detecting code.

16. The apparatus of claim 15, the error detecting code comprises a cyclic redundancy check (CRC).

17. A system comprising:
a client device comprising a display; and.
a device extension that is communicatively coupled to the client device, wherein the device extension is separate from the client device and magnetically coupled to the client device, the device extension comprising:
a transceiver;
a processor; and
a memory having instructions stored thereon; when executed by the processor, causes the device extension to perform operations comprising:
receiving using the transceiver a limit Signal from a light source associated with an establishment or a corporation; wherein the light source is an optical beacon that includes a Light-Emitting Diode (LED), an LED driver, a micro-controller and a power source,
decoding the light signal to generate a network address associated with the establishment or the corporation, and
causing the display of the client device to display a website corresponding to the network address.

18. An apparatus comprising:
a transceiver;
a processor; and
a memory having instructions stored thereon, when executed by the processor, causes the processor to perform operations comprising:
receiving using the transceiver a light signal from a light source associated with an establishment or a corporation, wherein the light source is an optical beacon that includes a Light-Emitting Diode (LED), an LED driver, a micro-controller and a power source,
decoding the light signal to generate a network address associated with the establishment or the corporation, and
causing a client device to display a website corresponding to the network address wherein the apparatus is communicatively coupled to the client device, wherein the apparatus is separate from the client device and removably coupled to the client device.

19. The apparatus of claim 18, wherein the transceiver is an infrared (IR) lightcode transceiver.

20. The apparatus of claim 18, wherein the light signal is structured to generate a temporal code.

21. The apparatus of claim 18, wherein the light signal is an infrared wavelength.

* * * * *